US007722705B2

(12) United States Patent
Gadkaree et al.

(10) Patent No.: US 7,722,705 B2
(45) Date of Patent: May 25, 2010

(54) ACTIVATED CARBON HONEYCOMB CATALYST BEDS AND METHODS FOR THE USE THEREOF

(75) Inventors: Kishor Purushottam Gadkaree, Big Flats, NY (US); Lin He, Horseheads, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 918 days.

(21) Appl. No.: 11/433,197

(22) Filed: May 11, 2006

(65) Prior Publication Data

US 2007/0261557 A1    Nov. 15, 2007

(51) Int. Cl.
   *B01D 53/02*  (2006.01)
(52) U.S. Cl. .............................. 95/134; 96/121; 96/131
(58) Field of Classification Search ................ 96/121, 96/125, 131, 134
   See application file for complete search history.

(56) References Cited

U.S. PATENT DOCUMENTS

| 4,814,152 | A |   | 3/1989  | Yan |
| 4,889,698 | A |   | 12/1989 | Moller et al. ............... 423/210 |
| 4,956,162 | A |   | 9/1990  | Smith et al. ................ 423/244 |
| 5,158,580 | A |   | 10/1992 | Chang ............................ 55/6 |
| 5,288,306 | A |   | 2/1994  | Aibe et al. |
| 5,451,444 | A |   | 9/1995  | DeLiso et al. .................... 3/12 |
| 5,487,917 | A |   | 1/1996  | Gadkaree .......................... 3/2 |
| 5,488,023 | A |   | 1/1996  | Gadkaree et al. ............... 21/18 |
| 5,505,766 | A |   | 4/1996  | Chang ......................... 95/134 |
| 5,510,063 | A |   | 4/1996  | Gadkaree et al. ........... 264/29.7 |
| 5,547,648 | A | * | 8/1996  | Buchanan et al. ........... 423/210 |
| 5,597,617 | A |   | 1/1997  | DeLiso et al. ..................... 3/2 |
| 5,658,372 | A |   | 8/1997  | Gadkaree ......................... 53/4 |
| 5,750,026 | A |   | 5/1998  | Gadkaree et al. ......... 210/502.1 |
| 5,820,967 | A |   | 10/1998 | Gadkaree .................... 428/116 |
| 5,820,969 | A |   | 10/1998 | Satoh .............................. 5/66 |
| 5,998,328 | A |   | 12/1999 | Dawes et al. ................... 21/18 |
| 6,024,899 | A |   | 2/2000  | Peng et al. ....................... 31/2 |
| 6,097,011 | A |   | 8/2000  | Gadkaree et al. .................. 1/2 |
| 6,136,072 | A |   | 10/2000 | Sjostrom et al. ................ 53/4 |
| 6,136,749 | A |   | 10/2000 | Gadkaree et al. ................ 27/2 |
| 6,156,697 | A |   | 12/2000 | Gadkaree ...................... 20/20 |
| 6,187,713 | B1 |  | 2/2001  | Gadkaree ...................... 31/12 |
| 6,228,803 | B1 |  | 5/2001  | Gadkaree et al. ................ 31/8 |
| 6,248,691 | B1 |  | 6/2001  | Gadkaree et al. ................ 20/2 |
| 6,251,822 | B1 |  | 6/2001  | Peng et al. ....................... 31/8 |
| 6,258,334 | B1 |  | 7/2001  | Gadkaree et al. .............. 53/46 |
| 6,328,939 | B1 |  | 12/2001 | Amrhein ..................... 423/210 |
| 6,372,289 | B1 |  | 4/2002  | Hickman ........................... 3/2 |

(Continued)

FOREIGN PATENT DOCUMENTS

EP            0 684 071       11/1995    ................ 20/20

(Continued)

*Primary Examiner*—Robert A Hopkins
(74) *Attorney, Agent, or Firm*—Steven J. Scott; Svetlana Z. Short

(57) ABSTRACT

Disclosed herein, without limitation, are activated carbon honeycomb catalyst beds and systems for removing mercury and other toxic metals from a process stream, i.e, from flue gas of a coal combustion system. The activated carbon honeycomb can for example remove greater than 90% mercury from flue gas with a simple design and without adding material to the flue gas. Also disclosed herein, and without limitation, are methods for manufacturing and using the disclosed honeycomb catalyst beds and systems.

15 Claims, 8 Drawing Sheets

U.S. PATENT DOCUMENTS

| | | |
|---|---|---|
| 6,455,023 B1 | 9/2002 | Gadkaree et al. |
| 6,503,470 B1 | 1/2003 | Nolan et al. ................ 423/210 |
| 6,579,507 B2 | 6/2003 | Pahlman et al. ............ 423/210 |
| 6,610,263 B2 | 8/2003 | Pahlman et al. .......... 423/239.1 |
| 6,652,629 B2 * | 11/2003 | Wolff et al. ................... 96/131 |
| 6,790,420 B2 | 9/2004 | Breen et al. .............. 423/215.5 |
| 2002/0124725 A1 | 9/2002 | Chang et al. ..................... 53/6 |
| 2006/0048646 A1 | 3/2006 | Olson et al. ...................... 53/2 |
| 2006/0142154 A1 | 6/2006 | Wolff |

FOREIGN PATENT DOCUMENTS

| | | | |
|---|---|---|---|
| EP | 0 894 530 | 2/1999 | ...................... 37/8 |
| WO | 2007/133867 A2 | 11/2007 | |

* cited by examiner

FIG. 8
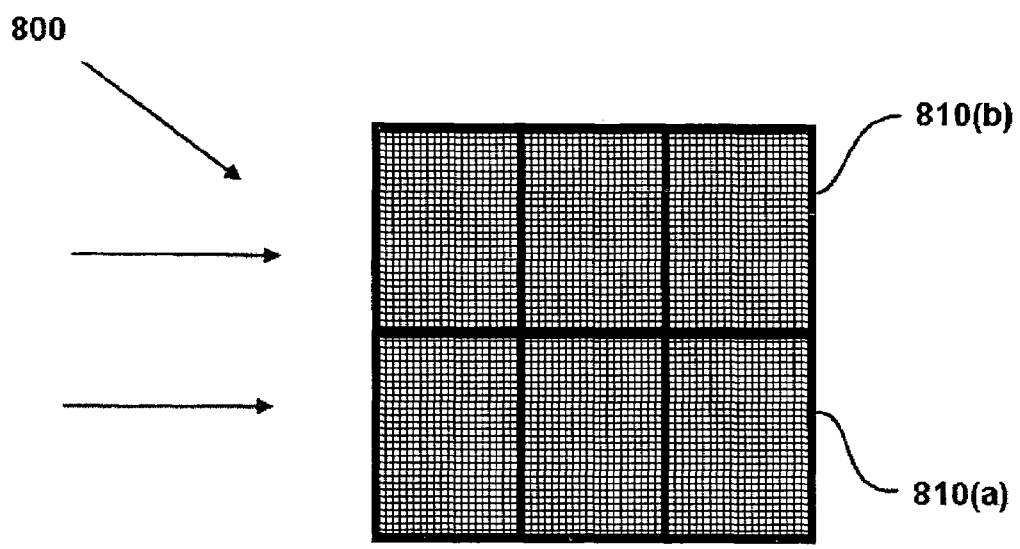
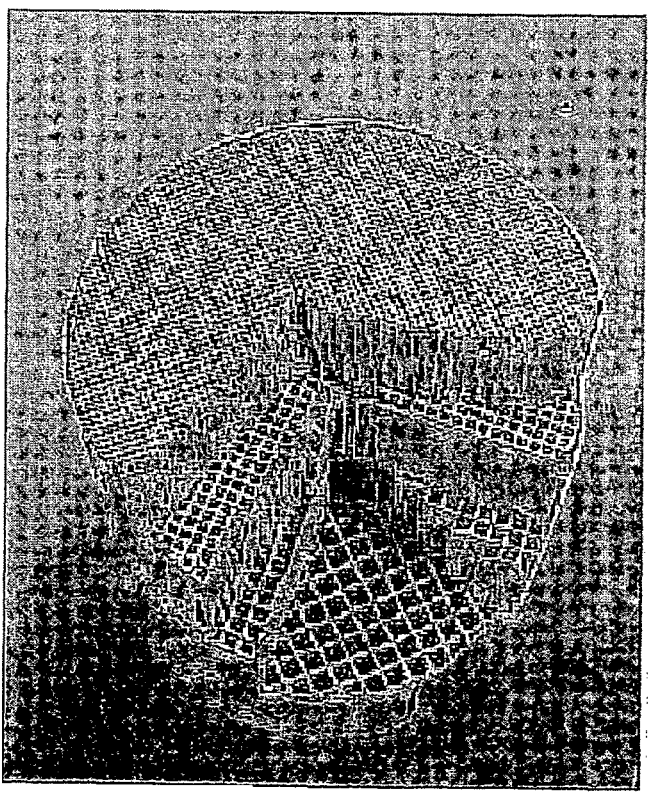
FIG. 9

ACTIVATED CARBON HONEYCOMB CATALYST BEDS AND METHODS FOR THE USE THEREOF

BACKGROUND OF THE INVENTION

1. Field of the Invention

The present invention relates to activated carbon honeycomb catalyst beds for removing mercury and/or other toxic metals from fluid process streams and systems comprised thereof.

2. Technical Background

Mercury is both a global pollutant and a contaminant that can be transformed to a potentially toxic species (methylmercury) under natural conditions. Mercury emitted to the atmosphere can travel thousands of miles before being deposited to the earth. Studies show that mercury from the atmosphere can also be deposited in areas near an emission source. According to a National Academy of Sciences study published in July, 2001, there are about 60,000 children, who are born in the USA, potentially affected by mercury toxicity every year. It has been reported that human inhalation of elemental mercury has acute effects on kidneys and the central nervous system (CNS), such as mild transient proteinuria, acute renal failure, tremors, irritability, insomnia, memory loss, neuromuscular changes, headaches, slowed sensory, motor nerve function, and reduction in cognitive function. Acute inhalation of elemental mercury can also affect gastrointestinal and respiratory systems, causing chest pains, dyspnea, cough, pulmonary function impairment, and interstitial pneumonitis. Study also indicates that chronic exposure of elemental mercury can cause the adverse effects on kidneys and CNS including erethism (increased excitability), irritability, excessive shyness, insomnia, severe salivation, gingivitis, tremors, and the development of proteinuria. Children exposed to elemental mercury compounds have been found to have acrodynia that is characterized by severe leg cramps, irritability, paresthesia (a sensation of prickling on the skin), and painful pink fingers and peeling hands, feet, and nose. Reference Concentration (RfC) for elemental mercury exposure set by EPA is 0.0003 mg/m$^3$, which is based on CNS effects in humans. Continuous exposure above the RfC level increases potential for adverse health effects. The main route of human exposure to methylmercury is the diet, such as eating fish. Acute exposure of methylmercury can cause CNS effects such as blindness, deafness, and impaired level of consciousness. Chronic exposure of methylmercury results in symptoms such as paresthesia (a sensation of prickling on the skin), blurred vision, malaise, speech difficulties, and constriction of the visual field. It is estimated that the minimum lethal dose of methylmercury for a 70-kg person ranges from 20 to 60 mg/kg.

Coal-fired power plants and medical waste incineration are major sources of human activity related mercury emission to the atmosphere. It is estimated that there are 48 tons of mercury emitted from coal-fired power plants in the US annually. DOE-Energy Information Administration annual energy outlook projects that coal consumption for electricity generation will increase from 976 million tons in 2002 to 1,477 million tons in 2025 as the utilization of existing and added coal-fired generation capacity increases. However, there has not been mercury emission control regulation enforced for coal-fired power plants. A major reason is that there is not an effective control technology available for a reasonable cost, especially for elemental mercury control.

The state of the art technology that has shown promise for controlling elemental mercury as well as oxidized mercury is active carbon injection (ACI). The method was disclosed early in U.S. Pat. No. 4,889,698. The ACI process includes injecting active carbon powder into the flue gas stream and using fabric fiber (FF) or electrostatic precipitator (ESP) to collect the active carbon powder that has adsorbed mercury. A pilot scale test of ACI-FF with the Norit Darco FGD carbon at a DOE/NETL test facility demonstrated that total mercury removal rate enhanced from 40% to 90% when ACI injection C:Hg ratio increased from 2,600:1 to 10,300:1. Comparison tests at the DOE/NETL facility showed that ACI-ESP could only achieve 70% mercury control at several times higher C:Hg ratio. Generally, ACI technologies require a high C:Hg ratio to achieve the desired mercury removal level (>90%), which results in a high portion cost for sorbent material. The high C:Hg ratio means that ACI does not utilize the mercury sorption capacity of carbon powder efficiently. A major problem associated with ACI technology is cost. If only one particle collection system is used, the commercial value of fly ash is sacrificed due to its mixing with contaminated activated carbon powder. Based on the cost estimation of DOE, the commercial value and disposal cost of fly ash is about 6.7 million dollars. U.S. Pat. No. 5,505,766 disclosed a method of using a system with two separate powder collectors and injecting activated carbon sorbent between the first collector for fly ash and the second collector, or a baghouse, for activated carbon powder. U.S. Pat. No. 5,158,580 described a baghouse with high collection efficiency. DOE estimation shows that the installation of additional baghouse for activated carbon powder collection costs about $28 million dollars, which is high especially for small companies.

Since water-soluble (oxidized) mercury is the main mercury species in bituminous coal flue gas with high concentrations of $SO_2$ and HCl, bituminous coal-fired plants may be able to remove 90% mercury using a wet scrubber combined with NOx and/or $SO_2$ control technologies. Mercury control can also be achieved as a co-benefit of particulate control. U.S. Pat. No. 6,328,939 disclosed a method of adding a chelating agent to a wet scrubbing solution because wet scrubber captured mercury can be reemitted. However, a chelating agent adds the cost due to the problems of corrosion of the metal scrubber equipment and treatment of the chelating solution. Removing oxidized mercury as a co-benefit of using a wet scrubber by injecting a calcium compound to remove SO2 was disclosed in U.S. Pat. No. 4,956,162. However, elemental mercury is the dominant species in the flue gas of sub-bituminous coal or lignite coal and a wet scrubber is not effective for removal of elemental mercury unless additional chemicals are added to the system. Injection of activated carbon into a system containing SCR and $SO_2$ control equipment was disclosed in U.S. Pat. No. 6,610,263 and U.S. Pat. No. 6,579,507. U.S. Pat. No. 6,503,470 described a method of adding sulfide-containing liquors to the flue gas stream and U.S. Pat. No. 6,790,420 described a method of adding ammonia and optionally carbon monoxide to enhance the oxidation of mercury at 900° F. and 1300° F. However, it is undesirable to add additional materials, potentially environmentally hazardous, into the flue gas system.

An activated carbon fixed bed can reach high mercury removal level with more effective utilization of sorbent material. However, a normal powder or pellet packed bed has very high pressure drop, which significantly reduces energy efficiency. Further, these fixed beds are generally an interruptive technology because they require frequent replacement of the sorbent depending on the sorption capacity. Accordingly, reducing the pressure drop and significantly increasing the mercury sorption capacity would allow the fix bed technology to be more practical and economical to the power plant users.

SUMMARY OF THE INVENTION

The present invention relates to activated carbon honeycomb catalyst beds and, more particularly, to toxic metal removal systems comprised thereof. The toxic metal removal systems of the present invention can remove greater than 90% mercury from flue gas with a simple design and without adding material to the flue gas.

In one embodiment the honeycomb fixed-bed system of the present invention does not require a secondary system, which is generally expensive, to remove the material added. Therefore, the activated carbon honeycomb system is simple and a low capital cost system. At the same time, fly ash from coal combustion can be saved. Compared to ACI, the activated honeycomb fixed-bed system uses activated carbon sorbents more efficiently and a lower amount of contaminated activated carbon material is generated with low hazardous waste disposal cost.

In another embodiment, a monolithic honeycomb sorbent bed is provided comprising a porous monolithic honeycomb body comprising activated carbon catalyst and having a plurality of parallel cell channels bounded by porous channel walls traversing the body from an upstream inlet end to a downstream outlet end. A quantity of at least one toxic metal adsorption co-catalyst is also bonded to at least a portion of the activated carbon catalyst.

In another embodiment, a system of the present invention comprises a plurality of activated carbon honeycomb monoliths having a plurality of parallel cell channels bounded by porous channel walls traversing the honeycomb monolith from an upstream inlet end to a downstream outlet end. In one embodiment, two or more activated honeycomb monoliths can be positioned adjacent to each other in series from upstream to downstream such that at least a portion of a flue gas conveyed through the downstream outlet end of a first honeycomb monolith is subsequently conveyed through at least a portion of the upstream inlet end of an immediately downstream second honeycomb monolith. In an alternative embodiment, the two or more honeycomb monoliths can be positioned adjacent and substantially parallel to each other.

In still another embodiment, the present invention provides a system for non-interruptive removal of a toxic metal from a process stream, comprising a plurality of activated carbon honeycomb monoliths, wherein the plurality of monoliths are positioned in selective fluid communication with a continuous stream of a toxic metal containing combustion flue gas; and a means for selectively directing the continuous stream of flue gas to at least one of the plurality of honeycomb monoliths.

The present invention further provides a method for separating mercury from a combustion flue gas. In one embodiment, the method can comprise the steps of providing a plurality of adjacent activated carbon honeycomb monoliths having a plurality of parallel cell channels bounded by porous channel walls traversing the honeycomb monolith from an upstream inlet end to a downstream outlet end; conveying a mercury containing combustion flue gas through at least a portion of the plurality of adjacent activated carbon monoliths.

In still another embodiment, the present invention provides a method for non-interruptive removal of mercury from a combustion flue gas. The method according to this embodiment can comprise the steps of providing a plurality of activated carbon honeycomb monoliths, wherein the plurality of monoliths are positioned in selective fluid communication with a continuous stream of a mercury containing combustion flue gas; and selectively directing the continuous stream of flue gas through at least one of the plurality of honeycomb monoliths.

Additional embodiments of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

FIG. 8 is a schematic view of an exemplary toxic metal adsorption system comprising a plurality of honeycomb monoliths positioned in series and in parallel.

FIG. 9 is a photograph of an exemplary toxic metal adsorption system of the present invention comprising at least two non-symmetrical honeycomb monoliths.

DETAILED DESCRIPTION OF THE INVENTION

Figure 1:
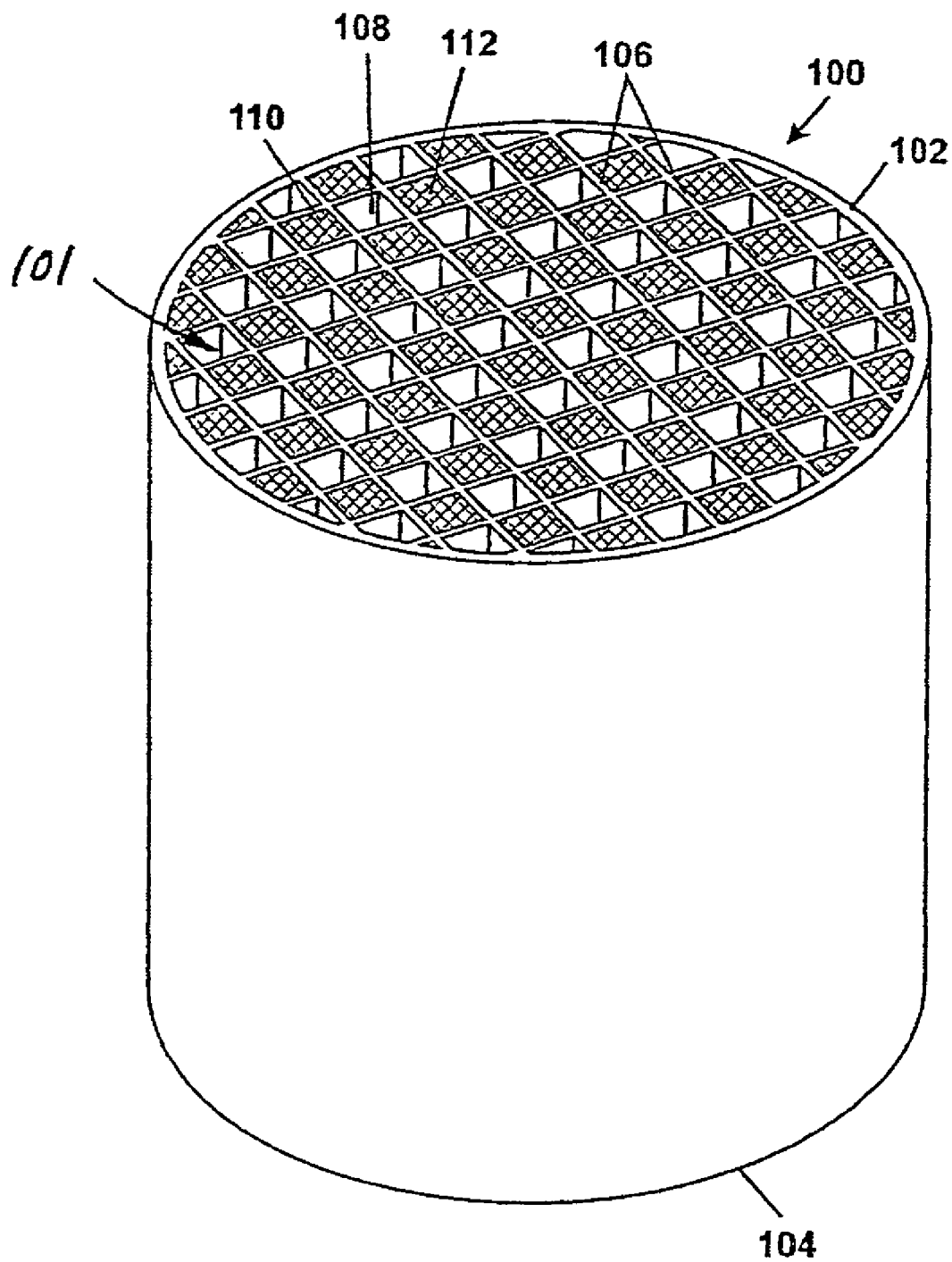
FIG. 1 is a perspective view of an exemplary end plugged wall flow honeycomb monolith according to one embodiment of the present invention.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "mercury containing compound" includes embodiments having two or more such mercury containing compounds, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition or article in which the component is included.

As briefly summarized above, the present invention relates to activated carbon containing catalyst sorbent beds having at least one toxic metal adsorption catalyst bonded thereto. The catalyst beds can be manufactured according to a variety of different methods and, to that end, can further comprise a variety of different configurations, depending on the particular intended use. Still further, the catalyst beds are in one embodiment, especially well suited for removing one or more toxic metals from a fluid process stream, including for example, the removal of hazardous and/or heavy metals such as Hg, Ni, Cr, Cd, Co, Pb, V, Se, Be, As, Zn, and the like, from a fluid process stream such as a coal gasification process stream or a combustion flue gas.

The honeycomb fixed-bed system can, for example, offer >90% of elemental mercury removal efficiency without adding active material(s) such as activated carbon powder or ammonia to the system. It does not require a secondary system, which is generally expensive, to remove the active material added, which allows designing simpler and low capital cost mercury removal systems. At the same time, the commercial value of fly ash from coal combustion can be saved. Compared to ACI, the activated honeycomb fixed-bed system uses activated carbon sorbents more efficiently.

Still further, the present invention also provides system configurations comprised of honeycomb monolith-based toxic metal sorbents with several possible advantages over conventional packed beds including, without limitation, decreasing the backpressure and therefore reducing power requirements for gas compression and recycle; increasing surface area to volume ratio and decreasing the mass and volume of the reactors; improving the reaction selectivity by providing better defined flow paths with minimal back mixing and eddy diffusion effects compared to random packed beds of catalyst; and improving operability.

The porous monolithic honeycomb body of the present invention comprises activated carbon and can be fabricated in the shape of a multicellular body having a plurality of parallel cell channels bounded by porous channel walls traversing the body from an upstream inlet end to a downstream outlet end. The activated carbon can be present in a honeycomb body in the form of fine powder granules, pellets, or as a shaped monolithic body. A quantity of at least one toxic metal adsorption co-catalyst can also be bonded to at least a portion of the activated carbon catalyst.

The honeycomb monoliths of the present invention comprise a total carbon content in the range of from 10% to 100% relative to the total weight of the honeycomb body including, for example, carbon contents of 15%, 20%, 25%, 30%, 35%, 40%, 45%, 50%, 55%, 60%, 65%, 70%, 75%, 80%, 85%, 90% and even 95%. In still another embodiment, the total carbon content can be in any range derived from these values including, for example, a range of from 40% to 100%, or even in a range of from 50% to 100%.

The at least one toxic metal adsorption co-catalyst can be selected from among Pt, Pd, Rh, Ag, Au, Fe, Re, Sn, Nb, V, Zn, Pb, Ge, As, Se, Co, Cr, Ni, Mn, Cu, Li, Mg, Ba Mo, Ru, Os, Ir, CaO, $CaSO_4$, $CaCO_3$, $Al_2O_3$, $SiO_2$, KI, $Fe_2O_3$, CuO, zeolite, kaolinite, lime, limestone, fly ash, sulfur, thiol, pyrite, bauxite, zirconia, a halogen or a halogen containing compound; a transition metal; transition metal salt; rare earth metal, noble metal, base metal, metal oxide; gold sol; or any combination thereof. In still another embodiment, the at least one toxic metal adsorption catalyst comprises elemental sulfur or a sulfur containing compound. To this end, sulfur is in one embodiment particularly useful for the removal of mercury from a fluid process stream. However, in another embodiment, it should be understood that the activated carbon honeycomb monoliths of the present invention can be absent or at least substantially absent of elemental sulfur and/or a sulfur containing compound.

The quantity of catalyst bonded to the activated carbon can be any quantity suitable to remove at least a portion of a desired toxic metal or metals from a process stream. However, in one embodiment, the quantity of toxic metal adsorption catalyst is in the range of from greater than 0.0 weight percent up to 50 weight percent, relative to the total weight of the honeycomb body and preferably 1 to 25 weight percent. For example, non-limiting quantities of adsorbent catalyst within this range can include 1.0, 5.0, 10.0, 15, 20, 30, 40, or even 45 weight percent. Preferably, the quantity of toxic metal adsorption catalyst bonded to the honeycomb body can be in the range of from 1.0 or 2 weight percent to 10 weight percent, including for example, 3.0, 7.0 or even 9.0 weight percent.

The monolithic honeycomb structures of the present invention can be further characterized according to their pore microstructure. For example, in one embodiment, it is desirable that the inventive honeycomb monoliths comprise a total open pore volume or porosity (% P) of at least about 10%, at least about 15%, at least about 25%, or even at least about 35%. Preferably, the total porosity is in the range of from 15% to about 70%, including porosities of 20%, 40%, and even 60%. It can also be preferred for the porosity to be "interconnecting" which is characterized by pores which connect into and/or intersect other pores to create a tortuous network of porosity within the substrate. As will be appreciated by one of ordinary skill in the art, the interconnecting pores can help to reduce undesirable levels of backpressure.

The channel density of the monolithic honeycombs that can be used for the application can range from 6 cells per square inch (cpsi) to 1200 cpsi. The wall thickness between the channels can range from 0.001" to 0.100", preferably 0.02" to 0.08", for example 0.050". The wall preferably contains interconnected micro-pores and/or nano-pores. The micro-pores can be defined as pores having diameter in the range of from 0.1 μm to 100 μm. The nano-pores can be defined as pores having diameter in the range of from 0.1 nm to 100 nm. To this end, as used herein the term "total open pore volume" is meant to include both nano-pores and micro-pores.

In order to facilitate efficient removal of one or more toxic metals from a fluid process stream, the honeycomb monoliths of the present invention can be characterized by a relatively high surface area to weight ratio. For example, in one embodiment, the activated carbon honeycomb monoliths of the present invention have a surface area to weight ratio of at least 5 $m^2/g$, at least 100 $m^2/g$, at least 250 $m^2/g$, at least 500 $m^2/g$, at least 750 $m^2/g$, or even at least 1000 $m^2/g$. It is preferable that, the specific surface area (surface area to weight ratio) is in the range of from 50 $m^2/g$ to 2500 $m^2/g$. It is more preferable that the specific surface area is in the range of from 200 $m^2/g$ to 1500 $m^2/g$. Still further, it is most preferable that, the honeycomb body has a specific surface area in the range of from 400 $m^2/g$ to 1200 $m^2/g$.

Generally, the honeycomb monolith beds of the present invention are configured to provide cell densities in the range from 6 cells/$in^2$ to 1500 cells/$in^2$, including exemplary cell densities of 9 cells/$in^2$, 50 cells/$in^2$, 100 cells/$in^2$, 300 cells/$in^2$, 500 cells/$in^2$, 600 cells/$in^2$, 900 cells/$in^2$, and even 1000 cells/$in^2$. Preferably, the cell density can be in the exemplary range of from 9 cells/$in^2$ to 1000 cells/$in^2$. More preferably, the cell density can be in the exemplary range of from 50 cells/$in^2$ to 900 cells/$in^2$. Typical cell wall (web) thicknesses can also range, for example, from about 0.001 inches to about 0.050 inches, more preferably from about 0.01 inches to 0.03 inches, or even more preferably from 0.002 inches to 0.025 inches. The diameter of a honeycomb monolith can be, for example, from about 1 inch to about 30 inches and more preferably from about 3 inches to about 15. Similarly, the body length of the monolith can be, for example, from about 0.2 inches to about 100 inches, and more preferably from about 0.5 inches to about 20 inches.

With reference to FIG. 1, an exemplary honeycomb monolith 100 is shown having an inlet 102 and outlet end 104, and a multiplicity of cells 108, 110 extending from the inlet end to the outlet end, the cells formed from intersecting porous walls 106. As shown, an inventive honeycomb monolith can optionally comprise one or more selectively plugged honeycomb cell ends. In particular, to provide a wall flow through structure, a portion of the cells 110 at the inlet end 102 can be plugged with a suitable plugging material.

The selective plugging is preferably performed only at the ends of the cells and thus forms plugs 112. A portion of the cells on the outlet end 104, but not corresponding to those on the inlet end 102, may also be plugged in a similar pattern. Therefore, each cell is preferably plugged only at one end. In one embodiment, a preferred arrangement is to have every other cell on a given face plugged as in a checkered pattern as further shown in FIG. 1.

Figure 2:
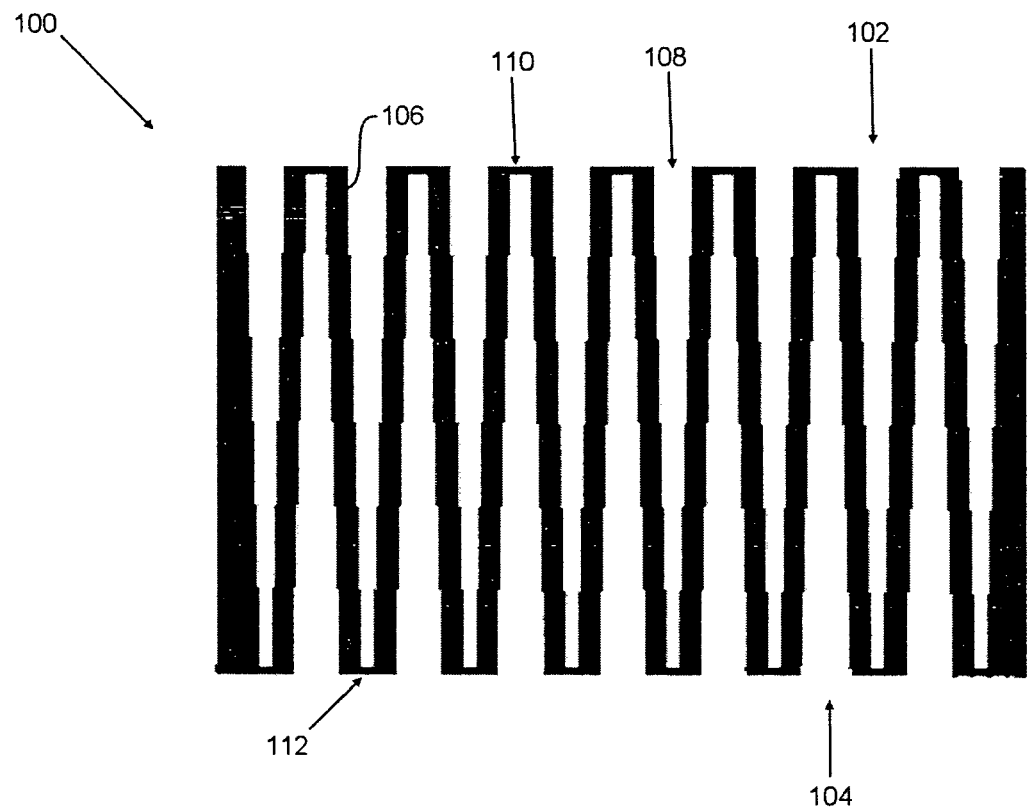
FIG. 2 is cross-sectional view of an exemplary end plugged wall flow honeycomb monolith according to an embodiment of the present invention wherein the end plugged cell channels taper outwardly and away from a plugged cell end toward an open cell end.

It will be appreciated that this plugging configuration allows for more intimate contact between the fluid process stream and the porous walls of the honeycomb monolith. The process stream flows into the honeycomb body through the open cells at the inlet end 102, then through the porous cell walls 106, and out of the body 101 through the open cells at the outlet end 104. Filters 100 of the type exemplified in FIG. 1 are known as "wall flow" structures since the flow paths resulting from alternate channel plugging require the fluid process stream being treated to flow through the porous cell walls prior to exiting the monolith sorbent bed. In one embodiment, it is desired for the open front area of an end plugged honeycomb monolith to be in the range of from 10% to 90%, including open areas of 20%, 30%, 40%, 50%, 60%, 70% and even 80%. It is preferable that the open front area of an end plugged honeycomb monolith can be in the range of from 35% to 75%. In one embodiment, and as illustrated in FIG. 2, a portion of the end plugged cell channels can taper outwardly and away from a plugged cell end toward an open cell end such that the open cell end has a larger cross-sectional area than the corresponding plugged end.

It will be appreciated by one of skill in the art upon practicing the present invention that typical mercury removal applications can require approximately 0.1 to 5 seconds of fluid stream to catalyst contact time for high efficiency mercury removal using free flow-through honeycombs. This contact time translates into the needs for a catalyst sorbent bed approximately 25 to 250 feet long in order to efficiently remove mercury from a flue gas having a flow rate of approximately 50 feet/s. However, the exemplary plug flow structure described above can enable a honeycomb bed system approximately 0.5 to 5 feet long to achieve the same level of efficiency because it increases flue gas and sorbent contact efficiency. In particular, the increased level of intimate contact between the flue gas and the monolithic sorbent results in fast kinetics for highly efficient mercury removal.

As summarized above, the present invention also provides methods for making a monolithic honeycomb sorbent bed as described herein. In one embodiment, a method of the present invention can generally comprise providing a honeycomb forming precursor batch composition comprising an activated carbon source and at least one toxic metal adsorbing co-catalyst. The precursor batch composition can be shaped to form a honeycomb monolith having a desired cell density and cell wall thickness. By first intimately mixing the at least one toxic metal adsorbing co-catalyst into the honeycomb forming precursor composition, the co-catalyst can be more uniformly distributed throughout the resulting honeycomb monolith structure. In one embodiment, the activated carbon source can comprise a synthetic carbon precursor which, upon heat treatment, can be carbonized to provide a continuous carbon structure. Alternatively, in another embodiment, the activated carbon source can comprise a preformed activated carbon powder or any other carbonaceous powder material such as polymer beads, petroleum coke or powders of coal. Still further, the precursor composition can comprise a combination of a synthetic carbon precursor and one or more of an activated carbon powder or any other carbonaceous powder material such as polymer beads, petroleum coke or powders of coal. Additionally, natural products such as wheat flour, rice flour, rice hull, wood flour, coconut shell flour, coal powder, and walnut shell flour can also be a part or full source of activated carbon.

In particular, a method according to this embodiment can comprise the steps of providing a honeycomb forming precursor batch composition comprising an activated carbon source and at least one toxic metal adsorption catalyst; shaping the precursor batch composition to provide a honeycomb green body having a plurality of parallel cell channels bounded by channel walls traversing the body from an upstream inlet end to a downstream outlet end; curing the honeycomb green body, heat treating the cured honeycomb green body to carbonize the synthetic carbon precursor; and activating the carbonized synthetic carbon precursor to produce an activated carbon honeycomb body having a plurality of parallel cell channels bounded by porous channel walls traversing the body from an upstream inlet end to a downstream outlet end, and having a quantity of a toxic metal adsorption catalyst bonded to at least a portion of the activated carbon.

As used herein, a synthetic carbon precursor refers to a synthetic polymeric carbon-containing substance that converts to a continuous structure carbon on heating. In one embodiment, the synthetic polymeric carbon precursor can be a synthetic resin in the form of a solution or low viscosity liquid at ambient temperatures. Alternatively, the synthetic polymeric carbon precursor can be a solid at ambient temperature and capable of being liquefied by heating or other means. Thus, as used herein, synthetic polymeric carbon precursors include any liquid or liquefiable carbonaceous substances.

Examples of useful carbon precursors include thermosetting resins and thermoplastic resins (e.g., polyvinylidene chloride, polyvinyl chloride, polyvinyl alcohol, and the like). Still further, in one embodiment, relatively low viscosity carbon precursors (e.g., thermosetting resins) can be preferred, having exemplary viscosity ranges from about 50 to 100 cps. In another embodiment, any high carbon yield resin can be used. To this end, by high carbon yield is meant that greater than about 10% of the starting weight of the resin is converted to carbon on carbonization.

In another embodiment, the synthetic carbon precursor can comprise a phenolic resin or furan resin. Phenolic resins can again be preferred due to their low viscosity, high carbon yield, high degree of cross-linking upon curing relative to other precursors, and low cost. Exemplary suitable phenolic resins are resole resin such as plyophen resin, or a furan liquid resin. An exemplary suitable furan liquid resin is Furcab-LP from QO Chemicals Inc. An exemplary solid resin well suited for use as a synthetic carbon precursor in the present invention is solid phenolic resin or novolak. Still further, it should be understood that mixtures of novolak and one or more resole resins can also be used as suitable carbon precursors.

The at least one toxic metal adsorbing catalyst can be introduced into the precursor batch composition prior to shaping. In one embodiment, the at least one toxic metal adsorption catalyst comprises sulfur. The sulfur can be provided as elemental sulfur or a sulfur containing compound. Exemplary sulfur containing compounds can include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, and mixtures thereof. When elemental sulfur is used, in one embodiment it can be preferred for the elemental sulfur to be relatively fine powdered sulfur having an average particle diameter that does not exceed about 100 micrometers. Still further, it is preferred that the elemental sulfur have an average particle diameter that does not exceed about 10 micrometers.

As described above, additional toxic metal adsorbing catalyst materials can include one or more of a transition metal, rare earth metal, noble metal, base metal or combination thereof. Exemplary catalyst metals can therefore include Pt, Pd, Rh, Ag, Au, Fe, Re, Sn, Nb, V, Zn, Pb, Ge, As, Se, Co, Cr, Ni, Mn, Cu, Li, Mg, Ba Mo, Ru, Os, Ir, or combinations of these. These metal catalysts are typically in the form of a precursor or compound, e.g., organic or inorganic salt of a catalyst metal which decomposes to the catalyst metal or catalyst metal oxide on heating such as sulfates, nitrates, and the like. Examples of such compounds can include oxides, chlorides, (non alkali or alkaline earths) nitrates, carbonates, sulphates, complex ammonium salts, organometallic compounds, and the like. Still further, additional catalyst materials can also include CaO, $CaSO_4$, $CaCO_3$, $Al_2O_3$, $SiO_2$, KI, $Fe_2O_3$, CuO, zeolite, kaolinite, lime, limestone, fly ash, sulfur, thiol, pyrite, bauxite, zirconia, a halogen or halogen containing compound; gold sol; or any combination thereof. The aforementioned catalysts can in one embodiment be added to the extrusion batches, provided they will not participate in an undesired chemical reaction during a carbonization or activation process. Alternatively, a catalyst, such as for example, $CaCO_3$, limestone, KI, halogens, and some halogen compounds, can also be loaded to the activated carbon honeycombs by conventional washcoating or impregnation processes.

Prior to shaping the precursor composition, the honeycomb forming mixture comprised of the activated carbon source and at least one toxic metal adsorbing catalyst, can optionally be mixed with one or more binders, fillers, and/or forming aids. Exemplary binders that can be used are plasticizing temporary organic binders such as cellulose ethers. Typical cellulose ethers include methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Further, methylcellulose and/or methylcellulose derivatives are especially suited as organic binders in the practice of the present invention, with methylcellulose, hydroxypropyl methylcellulose, or combinations of these being preferred.

Exemplary fillers that are also suited for use in the precursor batch composition include both natural and synthetic, hydrophobic, and hydrophilic, fibrous and nonfibrous, carbonizable and non-carbonizable fillers. For example some natural fillers are soft woods, e.g. pine, spruce, redwood, etc.; hardwoods, e.g. ash, beech, birch, maple, oak, etc.; sawdust, shell fibers, e.g. ground almond shell, coconut shell, apricot pit shell, peanut shell, pecan shell, walnut shell, etc.; cotton fibers, e.g. cotton flock, cotton fabric, cellulose fibers, cotton seed fiber; chopped vegetable fibers, for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Examples of carbonizable fillers that are especially suited for liquid resins are cellulose, cotton, wood, and sisal, or combinations of these, all of which are preferably in the form of fibers. One especially suited carbonizable fiber filler is cellulose fiber as supplied by International Filler Corporation, North Tonawanda, N.Y. This material has the following sieve analysis: 1-2% on 40 mesh (420 micrometers), 90-95% thru 100 mesh (149 micrometers), and 55-60% thru 200 mesh (74 micrometers).

Exemplary inorganic fillers that can be used include oxygen-containing minerals or salts thereof, such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, boehmite, spinel, feldspar, attapulgites, and aluminosilicate fibers, cordierite powder, etc. Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2-6 micrometers in diameter and about 20-50 micrometers in length. Additional examples of inorganic fillers are various carbides, such as silicon carbide, titanium carbide, aluminum carbide, zirconium carbide, boron carbide, and aluminum titanium carbide; carbonates or carbonate-bearing minerals such as baking soda, nancolite, calcite, hanksite and liottite; and nitrides such as silicon nitride.

Hydrophobic organic fillers can also provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

Additional exemplary binders and fillers that are well suited for use in the instant invention are disclosed and described in U.S. Pat. No. 5,820,967, the entire disclosure of which is incorporated herein by reference.

If desired, forming aids, e.g. extrusion aids, can also be included in the precursor batch compositions. To this end, exemplary forming aids can include soaps, fatty acids, such as oleic, linoleic acid, etc., polyoxyethylene stearate, etc. or combinations thereof. In one embodiment, sodium stearate is a preferred forming aid. Optimized amounts of the optional extrusion aid(s) will depend on the composition and binder. Other additives that are useful for improving the extrusion and curing characteristics of the batch are phosphoric acid and oil. Phosphoric acid improves the cure rate and increases adsorption capacity. It is typically about 0.1% to 5 wt. % in the mixture.

Still further, an oil addition can aid in extrusion and can result in increases in surface area and porosity. To this end, an optional oil can be added in an amount in the range of from about 0.1 to 5 wt. % of the precursor batch composition mixture. When used, the oil should be water immiscible, so that it can form a stable emulsion with any liquid polymeric resins. Exemplary oils that can be used include petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oils are 3 in 1 oil from 3M Co., or 3 in 1 household oil from Reckitt and Coleman Inc., Wayne, N.J. Other useful oils can include synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, etc. are also useful. Especially suited are oils having a viscosity of about 10 to 300 cps, and preferably about 10 to 150 cps. The above ratios apply also to shaped activated carbon bodies. Generally the amount of activated carbon in the shaped body is about 10 to 98 wt %.

In order to obtain a desired pore structure, an optional pore-forming agent can be incorporated into the precursor batch composition. In one embodiment, exemplary pore forming agents can include polypropylene, polyester or acrylic powders or fibers that decompose in inert atmosphere at high temperature (>400° C.) to leave little or no residue. Alternatively, in another embodiment, a suitable pore former can form macropores due to particle expansion. For example, intercalated graphite, which contains an acid like hydrochloric acid, sulfuric acid or nitric acid, will form macropores when heated, due to the resulting expansion of the acid. Still further, macropores can also be formed by dissolving certain fugitive materials. For example, baking soda, calcium carbonate or limestone particles having a particle size corresponding to desired pore size can be extruded with carbonaceous materials to form monolithic sorbents. Baking soda, calcium carbonate or limestone forms water soluble oxides during the carbonization and activation processes, which can subsequently be leached to form macropores by soaking the monolithic sorbent in water.

The final honeycomb forming precursor batch composition is shaped to provide a honeycomb green body having a plurality of parallel cell channels bounded by channel walls traversing the body from an upstream inlet end to a downstream outlet end. The batch composition can be shaped by any known conventional process, such as, e.g., extrusion, injection molding, slip casting, centrifugal casting, pressure casting, dry pressing, and the like. In an exemplary embodiment, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The formed honeycomb green body is then subjected to heat treatment conditions effective to cure the formed green body and, depending on the precursor batch composition, to carbonize any carbon precursor components present in the batch composition. The curing is generally performed in air at atmospheric pressures and typically by heating the formed green body at a temperature of about 100° C. to about 200° C. for about 0.5 to about 5.0 hours. Alternatively, when using certain precursors, (e.g., furfuryl alcohol) curing can also be accomplished by adding a curing catalyst such as an acid catalyst at room temperature. The curing can, in one embodiment, serve to retain the uniformity of the toxic metal adsorbing catalyst distribution in the carbon.

Carbonization is the thermal decomposition of the carbonaceous material, thereby eliminating low molecular weight species (e.g., carbon dioxide, water, gaseous hydrocarbons, etc.) and producing a fixed carbon mass and a rudimentary pore structure in the carbon. Such conversion or carbonization of the cured carbon precursor is accomplished typically by heating to a temperature in the range of about 600° C. to about 1000° C. for about 1 to about 10 hours in a reducing or inert atmosphere (e.g., nitrogen, argon, helium, etc.). Curing and carbonizing the carbon precursor results in substantially uninterrupted carbon with sulfur dispersed thereon and the interaction between the sulfur and the carbon is improved.

The cured and carbonized honeycomb body can then be heat-treated to activate the carbon and produce an activated carbon structure having a quantity of the at least one toxic metal adsorbing catalyst bonded thereto. The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

In order to provide a wall flow configuration as described above, the methods of the present invention can further comprise selectively plugging at least one predetermined cell channel end with a plugging material to form a selectively plugged honeycomb structure. The selective plugging can be performed before curing the synthetic carbon precursor green body or, alternatively, after the carbonization process or activation process is completed. For an exemplary pre-curing plug process, the plugging materials can be selected from those having similar shrinking rate with honeycombs during the carbonization process. Examples can include the same or similar batch composition used to form the honeycomb body, or a slightly modified composition comprising one or more synthetic carbon precursors. For an exemplary post-carbonization or post-activation process, any material that can seal the channels and sustain the desired application temperature (e.g., 150° C. to 300° C.) can be used. Examples can include UV-curable or thermally curable polymer resins such as phenolic resins and epoxy resins, thermal curable inorganic pastes such as $Al_2O_3$, $SiO_2$, $TiO_2$, $ZrO_2$ or a mixture thereof, and inorganic-organic hybrid materials that contain one or more UV-curable or thermally curable polymers and one or more inorganic compositions such as $Al_2O_3$, $SiO_2$, $TiO_2$, $ZrO_2$, Si, SiC, or carbon fiber. In addition, a channel size matched solid with a thermal curable adhesive can also be used as the post-carbonization or activation process materials. The solid can be selected from materials that can sustain the desired application temperature (e.g., 150° C. to 300° C.), such as glass, wood, and polymer. The adhesive can again be any material or combination of materials mentioned above for plugging without the channel size matched solid.

To accomplish the plugging process, a syringe can be used for dispensing an amount of plugging material into a desired cell. Alternatively, a mask can be used to cover or block selective honeycomb channels alternately and allow the plugging materials to be spread into the ends of the unmasked or uncovered channels. The syringe plugging and mask spreading plugging can be completed manually or using automated equipment. In one embodiment, it is preferred that the viscosity of plugging materials be adjusted to the range between 400 cP and 5000 cP to allow dispensing or spreading.

In still another embodiment, a honeycomb monolith according to the present invention can be fabricated by treating a preformed activated carbon containing honeycomb body, having a plurality of parallel cell channels bounded by porous channel walls traversing the honeycomb body from an upstream inlet end to a downstream outlet end, with at least one toxic metal adsorption co-catalyst source under conditions effective to bond the toxic metal adsorption co-catalyst to the activated carbon. The preformed honeycomb monolith can, in one embodiment, comprise activated carbon and can be manufactured according to the methods described above. Still further, the preformed body can already comprise at least one toxic metal adsorbing catalyst or, alternatively, can be absent of any toxic metal adsorbing catalyst.

According to this embodiment, if no catalyst has been added to a preformed monolithic structure, or if an additional catalyst is desired, the preformed honeycomb monolith can be treated with one or more toxic metal adsorption co-catalyst sources under conditions effective to bond the at least one toxic metal adsorption co-catalyst to the activated carbon present in the preformed monolithic honeycomb structure. This can be done by any standard techniques such as spraying or dipping the monolith structure into a solution of the appropriate co-catalyst salts in aqueous or organic solvents and then heating typically to temperatures of about 100° C. to 600° C. for about 1 to 20 hours. This is done preferably by drying at temperatures of up to about 120° C. usually for up to about 16 hours, followed by calcining in a non-reacting atmosphere such as e.g. nitrogen for about 2 hours.

In one exemplary embodiment, sulfur can be impregnated or washcoated onto a preformed activated carbon honeycomb monolith. The impregnation of sulfur can be done using, for example, a gas phase treatment (such as $SO_2$ or $H_2S$) or solution treatment (such as $Na_2S$ solution). The sulfur treated monolithic honeycomb sorbent can then be heated in an inert gas, such as nitrogen, for at least 10 minutes and at 200° C. to 900° C., more preferably at 400° C. to 800° C., or even most preferably at 500° C. to 650° C.

Figure 3:
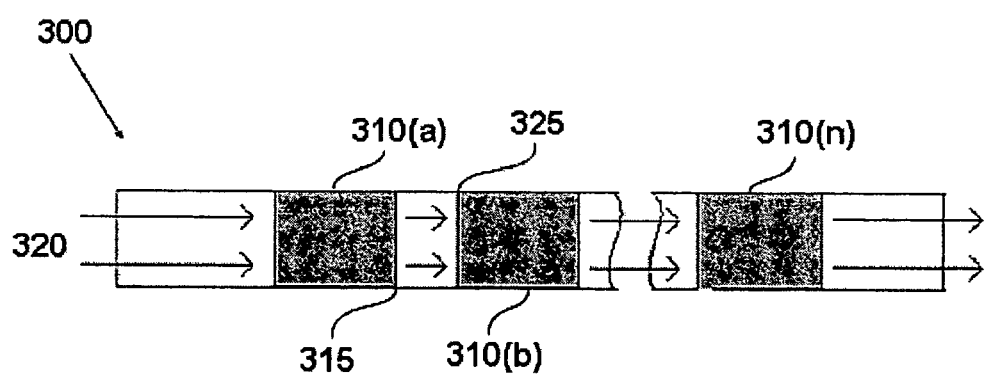
FIG. 3 is a schematic view of an exemplary toxic metal adsorption bed system comprising a plurality of honeycomb monoliths of the present invention.

In another embodiment summarized above, the present invention also provides a system for removing a toxic metal, e.g., mercury, from a fluid process stream such as a combustion flue gas, comprising a plurality of activated carbon honeycomb monoliths as described above. The honeycomb monoliths comprise a plurality of parallel cell channels bounded by porous channel walls traversing the honeycomb monolith from an upstream inlet end to a downstream outlet end. According to various embodiments to be discussed below, the plurality of honeycomb monoliths can be positioned in differing arrangements or in a combination of differing arrangements relative to each other. For example, in a first embodiment exemplified in FIG. 3, a toxic metal removal system 300 can comprise two or more activated honeycomb monoliths 310, positioned adjacent to each other in series from upstream to downstream such that at least a portion of a process stream 320 conveyed through the downstream outlet end 315 of a first honeycomb monolith 310(a) is subsequently conveyed through at least a portion of the upstream inlet end 325 of an immediately downstream second honeycomb monolith 310(b).

Figure 4:
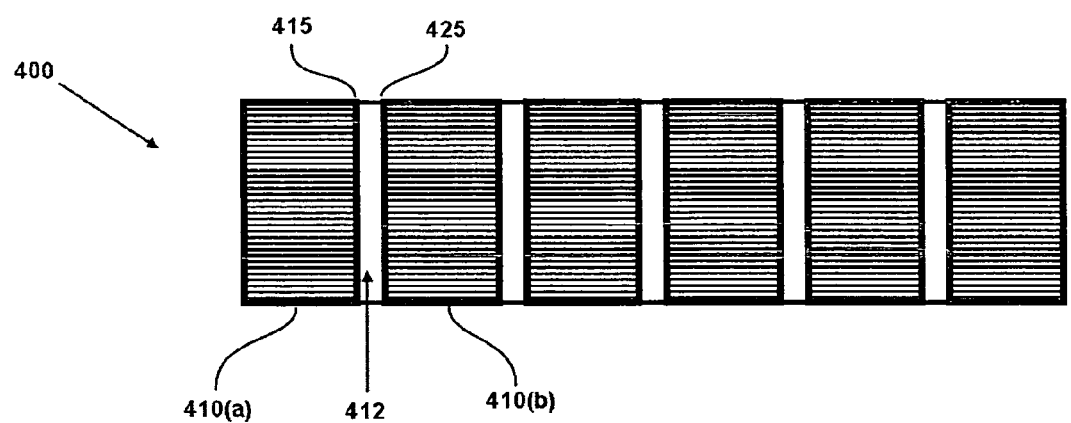
FIG. 4 is a schematic view of an exemplary toxic metal adsorption system comprising a plurality of honeycomb monoliths positioned in series whereby the monolith beds are separated a predetermined distance to provide an annular gap between the downstream outlet end of a first honeycomb monolith and the upstream inlet end of an immediately downstream honeycomb monolith.

As shown in FIG. 4, a toxic metal removal system 400 can comprise two or more adjacent honeycomb monoliths 410 that are positioned in series and that are separated by a predetermined distance such that an annular gap 412 is defined between the downstream outlet end 415 of a first monolith and an upstream inlet end 425 of an immediately downstream second monolith. The annular gap 412 can, for example, be utilized to provide improved mixing of the process stream and a decreased pressure drop across the system. The gap can be dimensioned according to any size, however, in one embodiment; the gap can be sized such that the distance between adjacent honeycomb monoliths is between 1 mm to 100 mm, and more preferably between 5 mm to 50 mm, depending on the process stream flow rate.

Figure 5:
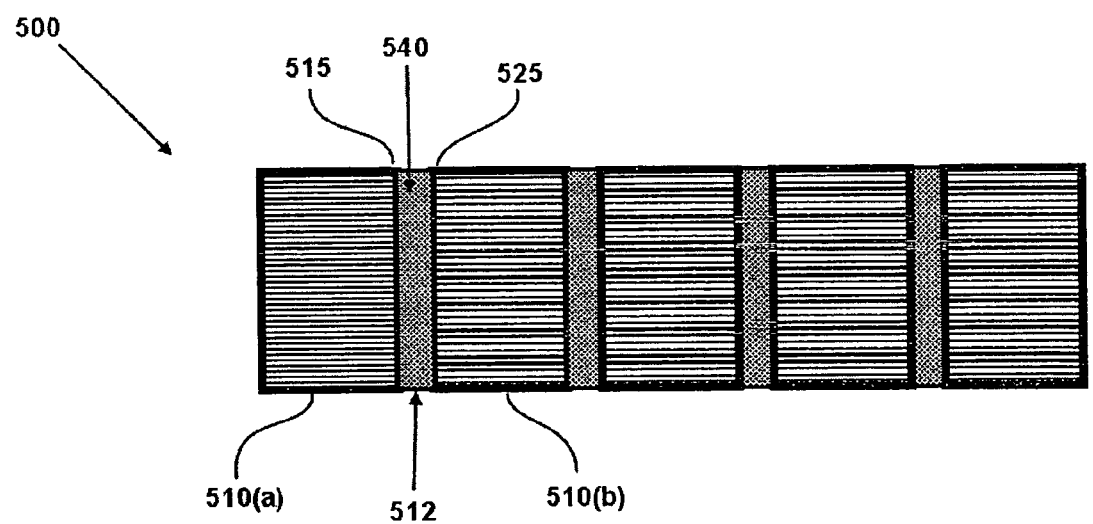
FIG. 5 is a schematic view of the exemplary toxic metal adsorption system of FIG. 4, whereby the annular gap further comprises a packed bed of a toxic metal adsorbent material.

Still further, as exemplified in FIG. 5, an annular gap 512 defined between the downstream outlet of the first honeycomb monolith and the upstream inlet of an immediately downstream honeycomb monolith can optionally comprise a packed layer 540. In one embodiment, the packed layer can provide added mixing of the fluid stream. Still further, the packed layer can comprise an absorbent or catalytic material such that the packed layer can provide added removal of a toxic metal from a process stream. To that end, suitable materials for the packed layer 540 can include, for example, activated carbon pellets, and non-porous or porous inorganic filler or catalyst materials described above, such as flyash, cordierite, iron oxide, aluminum oxide, carbides, and the like. Still further, conventional glass materials such as sodalime glass can also be used. In one embodiment, the preferred particle size of the packing layer materials is between 0.05 mm to 20 mm, and more preferably between 0.1 mm and 5 mm. The packed layer materials can be pellets, mini-monolith, foams, etc.

Figure 6:
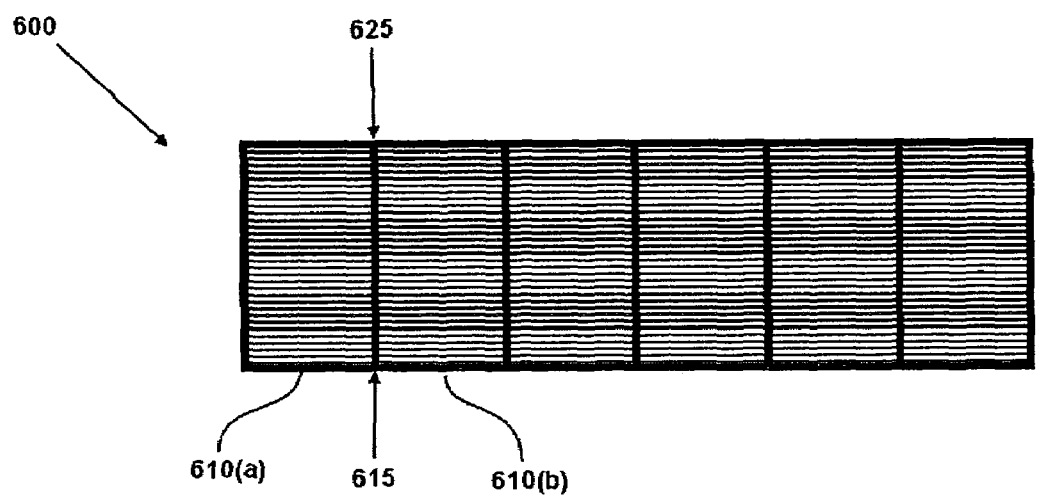
FIG. 6 is a schematic view of an exemplary toxic metal adsorption system comprising a plurality of honeycomb monoliths positioned in series whereby the monolith bed are connected such that there is no annular gap formed between the downstream outlet end of a first honeycomb monolith and the upstream end of an immediately downstream monolith bed.

In an alternative embodiment, and as exemplified in FIG. 6, a toxic metal removal system 600 can comprise two or more adjacent honeycomb monoliths 610 positioned in series such that the downstream outlet end 615 of a first honeycomb monolith 610(a) is connected to an upstream inlet end 625 of an immediately downstream second honeycomb monolith 610(b) such that there is substantially no annular space defined between the downstream outlet end of the first honeycomb monolith and the upstream inlet end of the immediately downstream honeycomb monolith.

Figure 7:
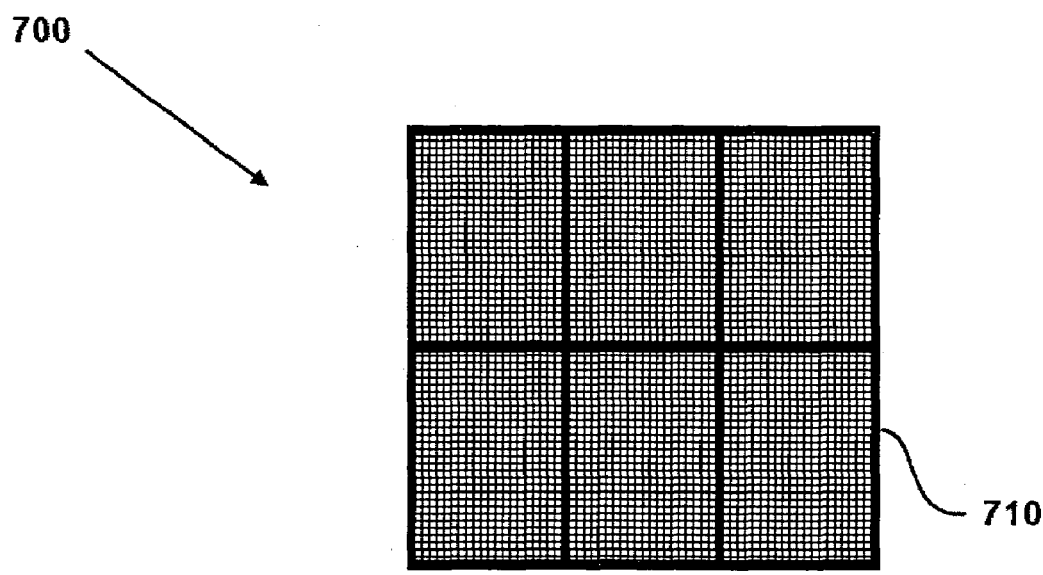
FIG. 7 is a top schematic view of an exemplary toxic metal adsorption system comprising a plurality of honeycomb monoliths positioned in parallel.

In still another embodiment, a system according to the present invention can comprise a plurality of activated carbon honeycomb monoliths having a plurality of parallel cell channels bounded by porous channel walls traversing the honeycomb monolith from an upstream inlet end to a downstream outlet end, wherein two or more honeycomb monoliths are positioned adjacent and substantially parallel to each other. For example, FIG. 7 illustrates an exemplary schematic top view of a system 700 comprising a plurality of six honeycomb monoliths 710 positioned parallel to one another. While any number of monoliths can be used, as shown the system comprises a grid of six honeycomb monoliths.

Still further, it should be understood that a system of the present invention can, in another embodiment, comprise a combination of honeycomb monoliths positioned in parallel and in series. For example, as exemplified in FIG. 8, a system 800 according to the present invention can comprise a plurality of honeycomb monoliths 810(a) positioned in series and a plurality of honeycomb monoliths 810(b) positioned in series, whereby at least one of the plurality of honeycomb monoliths 810(a) is positioned in parallel with at least one of the plurality of honeycomb monoliths 810(b).

Figure 10:
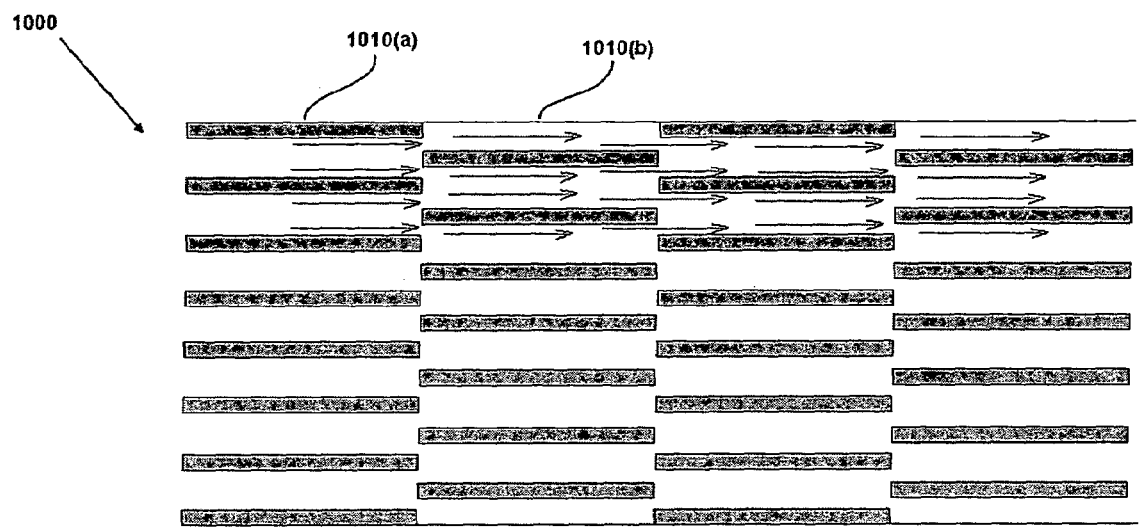
FIG. 10 is schematic view of an exemplary toxic metal adsorption system of the present invention comprising at least two honeycomb monoliths configured in an offset position relative to each other.

Any two or more immediately adjacent honeycomb monoliths, whether positioned in series or parallel, can be configured such that they are nonsymmetrical with respect to any one or more physical and/or chemical properties described above. For example, two or more immediately adjacent nonsymmetrical honeycomb monoliths can comprise different cell densities, porous channel walls of differing thickness, or even cell channels having differing cross-sectional geometries. To this end, exemplary cell geometries can include circular, square, triangular, rectangular, hexagonal, sinusoidal, or any combination thereof. For example, FIG. 9 illustrates an exemplary nonsymmetrical embodiment comprised of a stack of connected honeycomb monoliths positioned in series. In particular, shown is a graded stack of honeycomb monoliths comprised of differing cell densities. Similarly, FIG. 10 illustrates still another exemplary nonsymmetrical embodiment 1000 comprised of a plurality of honeycomb monoliths positioned in series, whereby a first monolith 1010(a) is positioned in a "jagged" or offset configuration relative to an immediately adjacent honeycomb monolith 1010(b). The use of this exemplary configuration can, for example, enable the use of large cell densities and, thus, decreased pressure drops across the system, while still obtaining a desired level of contact between the process stream and the porous cell walls of the plurality of honeycomb monoliths.

Figure 11:
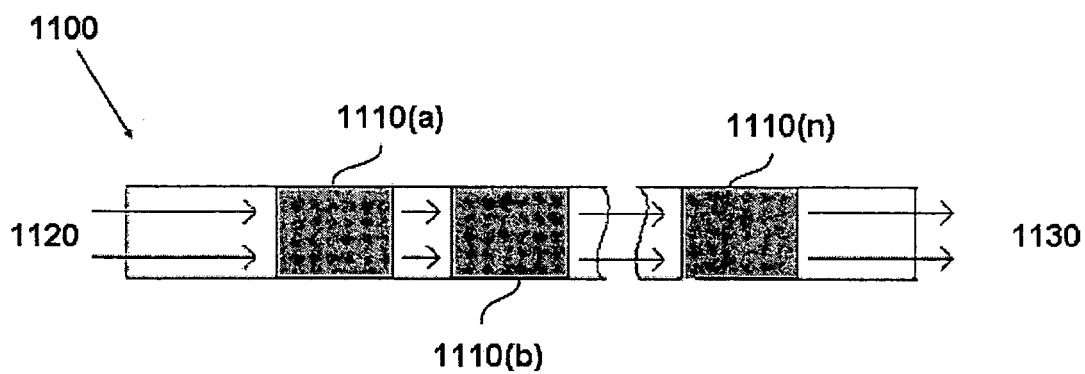
FIG. 11 is a schematic view of an exemplary toxic metal removal system of the present invention comprising two or more adjacent honeycomb monoliths wherein each monolith is optimized for removal of one or more toxic metals.

In still another embodiment, any two or more adjacent honeycomb monoliths, whether positioned in series or in a parallel configuration, can each be optimized for removal of one or more toxic metals. For example, as illustrated in FIG. 11, an exemplary multiple bed toxic metal adsorbent system 1100 comprises a plurality of honeycomb sorbent beds 1110 (a), (b) and (n). A process stream 1120 containing multiple toxic metals can be directed through the plurality of honeycomb sorbent beds. Each one of the plurality of honeycomb beds can be optimized for removal of a particular toxic metal. For example, honeycomb 1110(a) can be optimized to remove a first toxic metal, honeycomb 1110(b) can be optimized to remove a second toxic metal and honeycomb monolith 1110(n) can be optimized to remove an $n^{th}$ toxic metal. As the process stream passes through each of the respective honeycomb monoliths, the toxic metal for which the monolith was optimized can be substantially removed from the process stream. Thus, as the process stream passes through and exits the final honeycomb monolith 1110(n) a process stream 1130 having a substantially reduced concentration of "n" toxic metals can be provided by a single adsorption bed system.

In use, the toxic metal removal systems of the present invention further provides a method for separating one or more toxic metals from a process stream, such as for example, a combustion flue gas. Accordingly, a method according to one embodiment of the present invention can comprise the steps of providing a plurality of adjacent activated carbon honeycomb monoliths as described above, having a plurality of parallel cell channels bounded by porous channel walls traversing the honeycomb monolith from an upstream inlet end to a downstream outlet end. A process stream comprising at least one toxic metal, e.g., mercury, can then be conveyed through at least a portion of the plurality of adjacent activated carbon monoliths. To this end, in one embodiment and as described in detail above, the plurality of adjacent honeycomb monoliths can be positioned in series from upstream to downstream such that at least a portion of the combustion flue gas is conveyed through the downstream outlet end of a first honeycomb monolith and subsequently conveyed through at least a portion of the upstream inlet end of an immediately downstream second honeycomb monolith. Alternatively, the two or more adjacent activated honeycomb monoliths can be positioned substantially parallel to each other, as further described in detail above.

In still another embodiment, the present invention provides system configurations that can enable the non-interruptive removal of a toxic metal, e.g., mercury, from a process stream, i.e., from a combustion flue gas. To this end, in one embodiment, a non-interruptive system can comprise a plurality of activated carbon honeycomb monolith beds, wherein the plurality of monoliths are positioned in selective fluid communication with a continuous stream of a toxic metal containing process stream; and a means for selectively directing the continuous stream of flue gas to at least one of the plurality of honeycomb monolith beds. The plurality of honeycomb monolith beds can, in one embodiment, comprise a single activated carbon honeycomb monolith as described above. Alternatively, a honeycomb monolith bed can comprise a plurality of honeycomb monoliths positioned in series and/or parallel, as described above.

Figure 12:
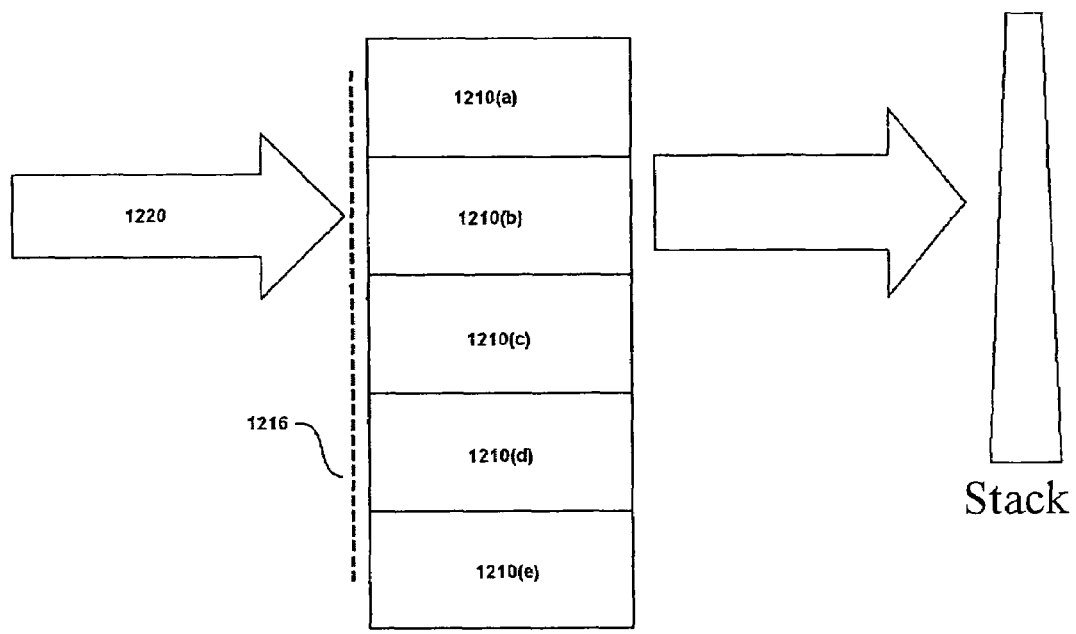
FIG. 12 is a schematic view of a system for non-interruptive removal of a toxic metal from a fluid process stream according to one embodiment of the present invention.

For example, with reference to FIG. 12, an exemplary system configuration 1200 for non-interruptive removal of a toxic metal, e.g., mercury, from a fluid process stream, e.g., a combustion flue gas, is shown. In this exemplary embodiment, a plurality of activated carbon honeycomb monolith beds 1210 are positioned in selective fluid communication with a continuous stream of a toxic metal containing combustion flue gas 1220. A means 1216 for selectively directing the continuous stream of flue gas to at least one of the plurality of honeycomb monolith beds is also provided. When the means 1216 is positioned in a manner that directs the stream of flue gas toward honeycomb monolith bed 1210(*b*), the honeycomb monolith bed 1212(*a*) is not in fluid communication with the stream of flue gas and thus can, if desired, be replaced or regenerated for subsequent reuse without interrupting the flow of the process stream toward the honeycomb monolith bed 1212(*b*).

After a period of usage, honeycomb monolith 1212(*b*) may become "spent" such that it no longer can provide a desired level of filtration efficiency for a target toxic metal. To this end, the non interruptive system can optionally comprise a toxic metal detector or sensor positioned downstream from the plurality of activated carbon honeycomb monoliths and in fluid communication with the continuous stream of flue gas. In one embodiment, the sensor can provide feedback indicating a concentration of toxic metal in the combustion flue gas downstream from the plurality of activated carbon honeycomb monoliths. In an exemplary embodiment, a suitable mercury sensor can be a continuous detection mercury analyzer manufactured by PS Analytical (Model PSA 10.680) or by Nippon Instruments (Model DM-6). The means 1216 for selectively directing the continuous stream of combustion flue gas can be responsive to the feedback provided by the sensor. Accordingly, when the concentration of mercury in the combustion flue gas exceeds a predetermined level, the stream of flue gas can be selectively directed from honeycomb monolith 1210(*b*) to another monolith, such as 1210(*a*), (*d*), (*c*), or (*e*), such that monolith 1210(*b*) is no longer in fluid communication with the stream of flue gas. Thus, monolith 1210(*b*) can then be replaced or regenerated without interrupting the continuous flow of the process stream. Accordingly, in still another embodiment, the system can further comprise a means for replacing and/or regenerating at least one activated carbon honeycomb monolith bed not in communication with the continuous stream of combustion flue gas, whereby the continuous flow of combustion flue gas is uninterrupted.

Figure 13:
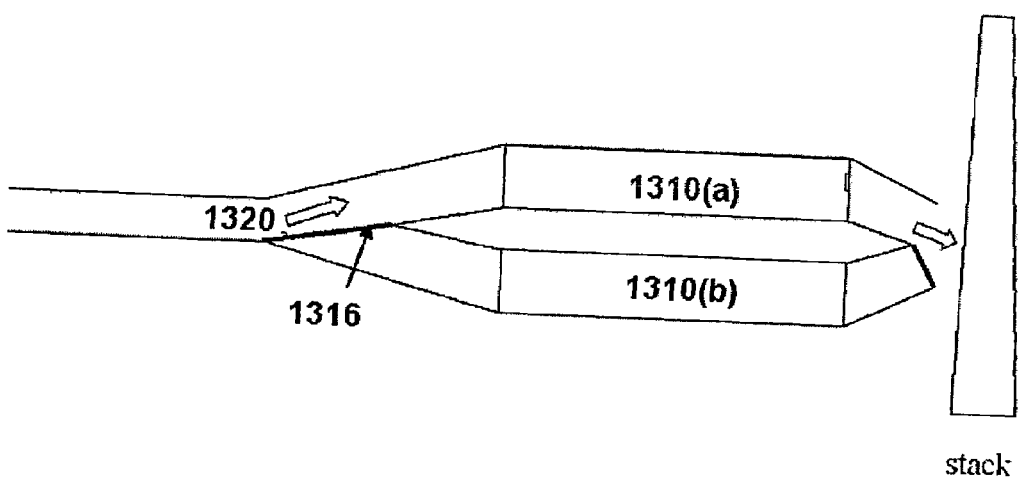
FIG. 13 is a schematic view of an exemplary system for non-interruptive removal of a toxic metal from a fluid process stream according to another embodiment of the present invention.
Figure 14:
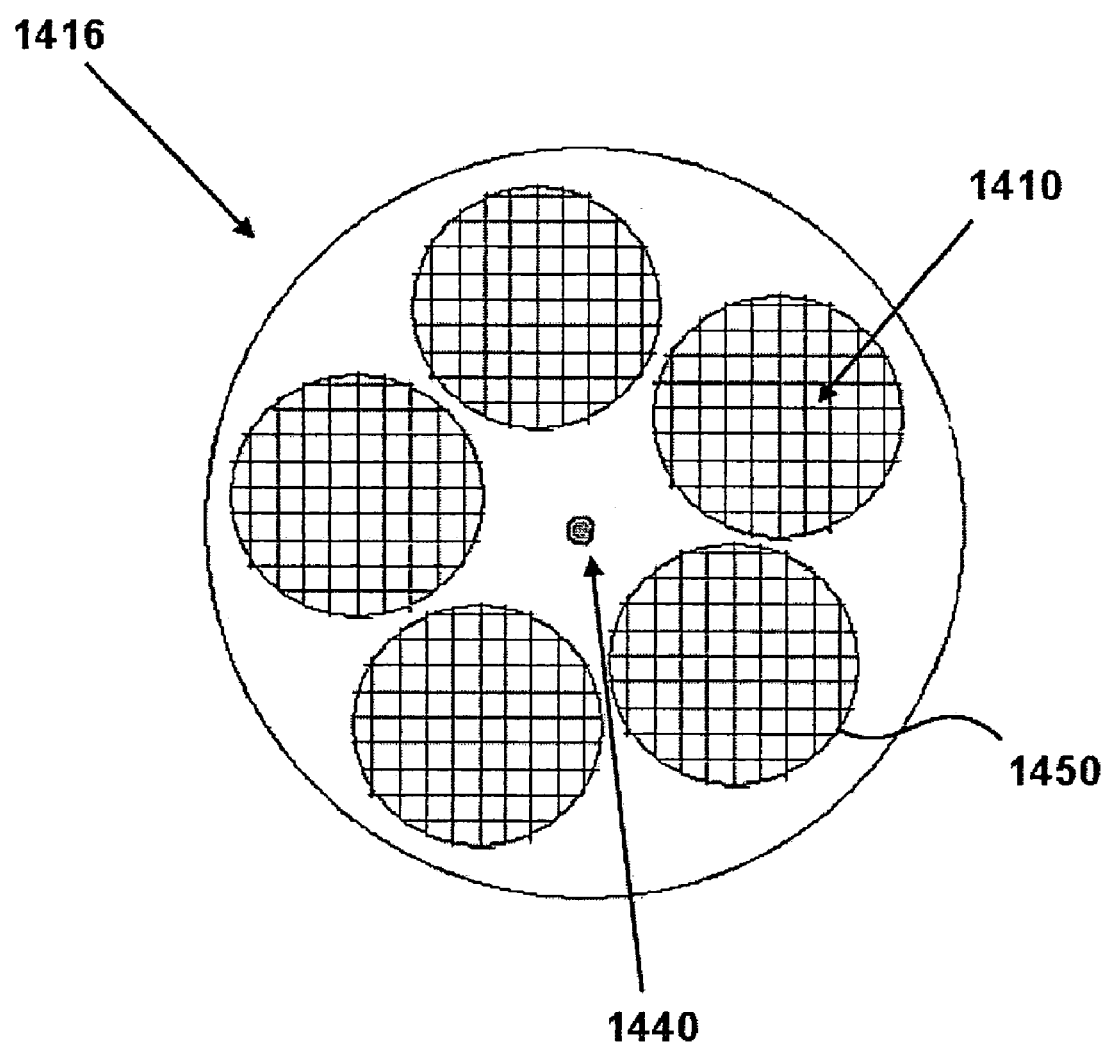
FIG. 14 is a schematic view of an exemplary system for non-interruptive removal of a toxic metal from a fluid process stream according to still another embodiment of the present invention.

The means for selectively directing the continuous stream of flue gas to at least one of the plurality of honeycomb monoliths can comprise any conventionally known device for selectively directing the flow of a fluid process stream. For example, as illustrated in FIG. 13, the means can comprise a movable or switchable door, shutter, or baffle 1316(*a*) configured to direct a flow of process stream toward a desired honeycomb bed. Alternatively, the means for selectively directing the flow of the process stream can comprise a plurality of doors or baffles corresponding to the plurality of honeycomb beds. According to this embodiment, when one of the plurality of doors or baffles is in the open position, the flow of the process stream will be directed to the honeycomb bed corresponding to the open door or baffle. The doors or baffles corresponding to the remaining honeycomb beds can remain in a closed position, thus preventing the flow of a process stream from being conveyed through the non-selected honeycomb monolith beds. In still another embodiment, and as illustrated in FIG. 14, a means for selectively directing the continuous stream of a process stream to at least one of the plurality of honeycomb monolith beds can comprise a cartridge 1416 rotatable about a central axis 1440. The cartridge can define a plurality of bores 1450 configured to house a plurality of activated carbon honeycomb monolith bed systems 1410 according to the present invention. The cartridge can be rotated to selectively position one of the housed activated carbon honeycomb monolith beds in fluid communication with the continuous stream of combustion flue gas.

In use, the non-interruptive system described above further provides a method for non-interruptive removal of at least one toxic metal from a process stream. Accordingly, in another embodiment, the present invention provides a method comprising the steps of: providing a plurality of activated carbon honeycomb monolith beds, wherein the plurality of monolith beds are positioned in selective fluid communication with a continuous stream of a toxic metal containing process stream. The continuous process stream containing at least one toxic metal can be selectively directed through at least one of the plurality of honeycomb monolith beds.

In instances where the system further comprises a toxic metal detection device, the method can further comprise detecting the concentration or level of a target toxic metal, such as mercury, in the process stream downstream from the plurality of activated carbon honeycomb monolith beds. Once the level or concentration of a target toxic metal within the process stream reaches a determined quantity, indicative of filtration efficiency at or below acceptable standards, the process stream can be selectively directed to a second one of the plurality of activated carbon honeycomb monolith beds. In one embodiment, the selective direction of the process stream can be automated based upon predetermined levels of toxic metal within the process stream. Still further, any one or more spent honeycomb monolith beds not in communication with the continuous stream of combustion flue gas can be replaced and/or regenerated without interrupting the continuous flow of a process stream.

It should also be understood that while the present invention has been described in detail with respect to certain illustrative and specific embodiments thereof, it should not be considered limited to such, as numerous modifications are possible without departing from the broad spirit and scope of the present invention as defined in the appended claims.

What is claimed is:

1. A system for removing mercury from a combustion flue gas, comprising:
    a plurality of activated carbon honeycomb monoliths having a plurality of parallel cell channels bounded by porous channel walls traversing the honeycomb monolith from an upstream inlet end to a downstream outlet end,
    wherein two or more activated honeycomb monoliths are positioned adjacent to each other in series from upstream to downstream such that at least a portion of a flue gas conveyed through the downstream outlet end of a first honeycomb monolith is subsequently conveyed through at least a portion of the upstream inlet end of an immediately downstream second honeycomb monolith,
    wherein two or more adjacent honeycomb monoliths positioned in series are separated a predetermined distance such that an annular gap is defined between the downstream outlet end of a first monolith and an upstream inlet end of an immediately downstream second monolith, and
    wherein the annular gap defined between the downstream outlet end of the first honeycomb monolith and the upstream inlet of an immediately downstream honeycomb monolith comprises a packed layer.

2. The system of claim 1, wherein the packed layer comprises a packed layer material selected from an activated carbon, metal oxide, carbide, glass, high temperature polymer, or any combination thereof.

3. The system of claim 2, wherein the packed layer comprises particulate material having a particle size in the range of from 0.05 mm to 20 mm.

4. A system for removing mercury from a combustion flue gas, comprising:
a plurality of activated carbon honeycomb monoliths having a plurality of parallel cell channels bounded by porous channel walls traversing the honeycomb monolith from an upstream inlet end to a downstream outlet end,
wherein two or more activated honeycomb monoliths are positioned adjacent to each other in series from upstream to downstream such that at least a portion of a flue gas conveyed through the downstream outlet end of a first honeycomb monolith is subsequently conveyed through at least a portion of the upstream inlet end of an immediately downstream second honeycomb monolith,
wherein the downstream outlet end of a first honeycomb monolith is connected to an upstream inlet end of an immediately downstream second honeycomb monolith such that there is substantially no annular gap defined between the downstream outlet end of the first honeycomb monolith and the upstream inlet end of the immediately downstream honeycomb monolith.

5. A system for removing mercury from a combustion flue gas, comprising:
a plurality of activated carbon honeycomb monoliths having a plurality of parallel cell channels bounded by porous channel walls traversing the honeycomb monolith from an upstream inlet end to a downstream outlet end,
wherein two or more activated honeycomb monoliths are positioned adjacent to each other in series from upstream to downstream such that at least a portion of a flue gas conveyed through the downstream outlet end of a first honeycomb monolith is subsequently conveyed through at least a portion of the upstream inlet end of an immediately downstream second honeycomb monolith,
wherein two or more immediately adjacent honeycomb monoliths are different with respect to any one or more physical and/or chemical properties.

6. The system of claim 5, wherein the two or more honeycomb monoliths comprise different cell densities.

7. The system of claim 5, wherein the two or more honeycomb monoliths comprise porous channel walls of differing thickness.

8. The system of claim 5, wherein the two or more honeycomb monoliths comprise cell channels having differing cross-sectional geometries.

9. A system for removing mercury from a combustion flue gas, comprising:
a plurality of activated carbon honeycomb monoliths having a plurality of parallel cell channels bounded by porous channel walls traversing the honeycomb monolith from an upstream inlet end to a downstream outlet end,
wherein two or more honeycomb monoliths are positioned adjacent and substantially parallel to each other,
wherein two or more immediately adjacent honeycomb monoliths are different with respect to any one or more physical and/or chemical properties.

10. The system of claim 9, wherein the two or more honeycomb monoliths comprise different cell densities.

11. The system of claim 9, wherein the two or more honeycomb monoliths comprise porous channel walls of differing thickness.

12. The system of claim 9, wherein the two or more honeycomb monoliths comprise cell channels having differing cross-sectional geometries.

13. A method for separating mercury from a combustion flue gas, comprising the steps of:
providing a plurality of adjacent activated carbon honeycomb monoliths having a plurality of parallel cell channels bounded by porous channel walls traversing the honeycomb monolith from an upstream inlet end to a downstream outlet end;
conveying a mercury containing combustion flue gas through at least a portion of the plurality of adjacent activated carbon monoliths,
wherein two or more adjacent activated honeycomb monoliths are positioned in series from upstream to downstream such that at least a portion of the combustion flue gas is conveyed through the downstream outlet end of a first honeycomb monolith and subsequently conveyed through at least a portion of the upstream inlet end of an immediately downstream second honeycomb monolith.

14. A method for separating mercury from a combustion flue gas, comprising the steps of:
providing a plurality of adjacent activated carbon honeycomb monoliths having a plurality of parallel cell channels bounded by porous channel walls traversing the honeycomb monolith from an upstream inlet end to a downstream outlet end;
conveying a mercury containing combustion flue gas through at least a portion of the plurality of adjacent activated carbon monoliths,
wherein two or more adjacent activated honeycomb monoliths are positioned in series from upstream to downstream such that at least a portion of the combustion flue gas is conveyed through the downstream outlet end of a first honeycomb monolith and subsequently conveyed through at least a portion of the upstream inlet end of an immediately downstream second honeycomb monolith,
wherein the downstream outlet end of a first honeycomb monolith and an upstream inlet end of an immediately downstream second honeycomb monolith are positioned such that there is substantially no annular gap defined between the downstream outlet end of the first honeycomb monolith and the upstream inlet end of the immediately downstream honeycomb monolith.

15. A system for removing mercury from a combustion flue gas, comprising:
a plurality of activated carbon honeycomb monoliths having a plurality of parallel cell channels bounded by porous channel walls traversing the honeycomb monolith from an upstream inlet end to a downstream outlet end,
wherein two or more activated honeycomb monoliths are positioned adjacent to each other in series from upstream to downstream such that at least a portion of a flue gas conveyed through the downstream outlet end of a first honeycomb monolith is subsequently conveyed through at least a portion of the upstream inlet end of an immediately downstream second honeycomb monolith,
wherein the two or more immediately adjacent honeycomb monoliths comprise different cell densities, porous channel walls of differing thickness or cell channels having differing cross-sectional geometries.

* * * * *